(12) United States Patent
Pandolfi

(10) Patent No.: US 6,486,855 B1
(45) Date of Patent: Nov. 26, 2002

(54) MOUNTED DISPLAY SYSTEM

(75) Inventor: Richard Pandolfi, Smithtown, NY (US)

(73) Assignee: IV Phoenix Group Inc., Plainview, NY (US)

( * ) Notice: Subject to any disclaimer, the term of this patent is extended or adjusted under 35 U.S.C. 154(b) by 1189 days.

(21) Appl. No.: 08/968,075

(22) Filed: Nov. 12, 1997

Related U.S. Application Data

(63) Continuation of application No. 08/585,775, filed on Jan. 16, 1996.

(51) Int. Cl.[7] .................................................. G09G 5/00
(52) U.S. Cl. ............................................................. 345/7
(58) Field of Search .................................. 345/7, 8, 84

(56) References Cited

U.S. PATENT DOCUMENTS

| | | | |
|---|---|---|---|
| 3,170,979 A | 2/1965 | Baldwin et al. ............... 345/8 |
| 4,265,561 A * | 5/1981 | Heckele .......................... 403/3 |
| 4,573,452 A * | 3/1986 | Greenberg .................... 128/20 |
| 4,637,536 A * | 1/1987 | Wong .......................... 224/262 |
| 4,991,758 A | 2/1991 | Eaneff .......................... 224/625 |
| 5,003,300 A | 3/1991 | Wells .......................... 224/262 |
| 5,305,244 A | 4/1994 | Newman .................. 364/708.1 |
| 5,360,196 A | 11/1994 | DiGiulio et al. ............. 248/576 |

* cited by examiner

Primary Examiner—Richard Hjerpe
Assistant Examiner—Ronald Laneau
(74) Attorney, Agent, or Firm—Venable; John P. Shannon; Chad C. Anderson

(57) ABSTRACT

An electric-powered display is retained in any of a large plurality of positions in the field of vision of a user by a mechanical linkage mounted on the user below the head.

4 Claims, 2 Drawing Sheets

MOUNTED DISPLAY SYSTEM

CROSS REFERENCE TO RELATED APPLICATION

This application is a continuation of application Ser. No. 08/585,775, filed Jan. 16, 1996.

BACKGROUND OF THE INVENTION

The present invention relates to hands-free computer displays and, more particularly, to an improved body mounted, hands-free electronic display.

Small computer displays are known in which the display is mounted on the head of a user, such as with a headband, so that the display is positioned in the user's line of sight while at the same time allowing the user to shift his or her line of sight away from the display. Although such arrangements leave the user's hands free, head-mounted displays have a drawback in that the display occupies a significant portion of the field of vision of one of the eyes of the user since the display moves when the user's head moves. The user cannot change his or her field of vision with respect to the display by moving his or her head. Furthermore, since the display is connected to a computer by a wire, the wire exerts an often annoying drag when the head or neck of the user is moved for any reason, and the additional weight of the display on the user's head can cause fatigue.

SUMMARY OF THE INVENTION

One object of the invention is the provision of a hands-free display, such as a miniature LCD display (or other miniature display implemented in a suitable technology) which permits the user to change his or her field of vision with respect to the display by moving his or her head.

Another object of the invention is the provision of a hands-free display that has six degrees of freedom of motion.

The system according to the present invention achieves the above objects by mounting the display support on the user's trunk, with a mechanical link which extends from the support to a housing that holds the display and which permits the positioning and retention of the display within the field of view of the user. The display can be retained in positions in a vertical plane extending directly forward from the eye, including positions below the level of the eye, at the level of the eye, and above the level of the eye. The display can also be retained in positions to the side of the eye and at various levels. Regardless of the position, the user can change his or her field of view with respect to the display by moving his or her head, and without using his or her hands. In one embodiment, the display system includes a curved, articulated, trunk-mounted support conforming to a shoulder of the user, a housing for the display, and a mechanical linkage between the shoulder support and the display member. In a specific embodiment, the linkage includes a plurality of frictional pivot joints or ball-and-socket joints and the trunk-mounted support includes a manual user interface (e.g. function keys and/or track ball) positioned on the front of the trunk-mounted support to permit control of the display and an associated computer. Signal and power conductors extend from the display, through the mechanical link, to the shoulder support to connect the display to a computer and power supply, which can be mounted in the shoulder support or elsewhere on the user.

DETAILED DESCRIPTION OF THE PREFERRED EMBODIMENT

Figure 1:
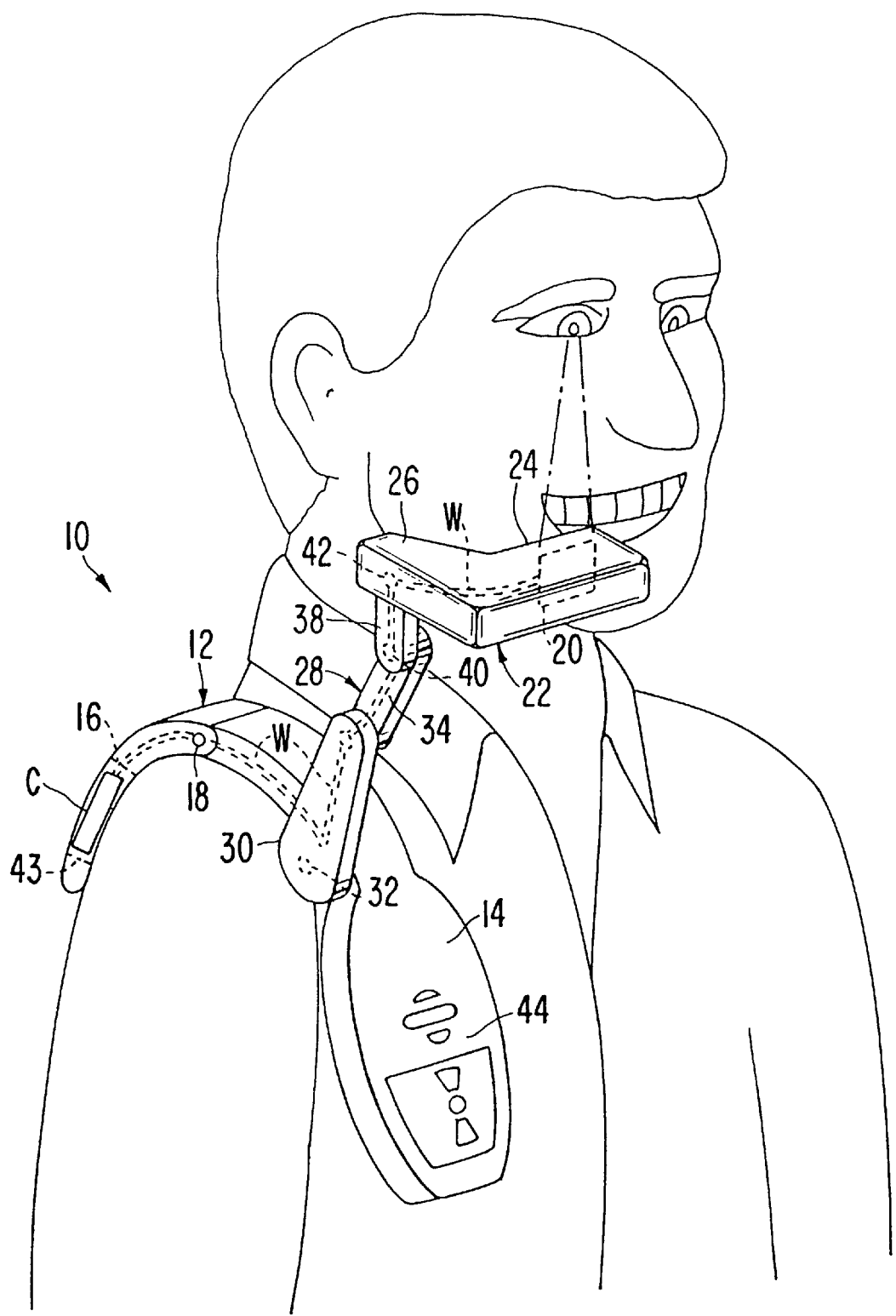
FIG. 1 is a perspective view of the upper body mounted display system according to the present invention.
Figure 2:
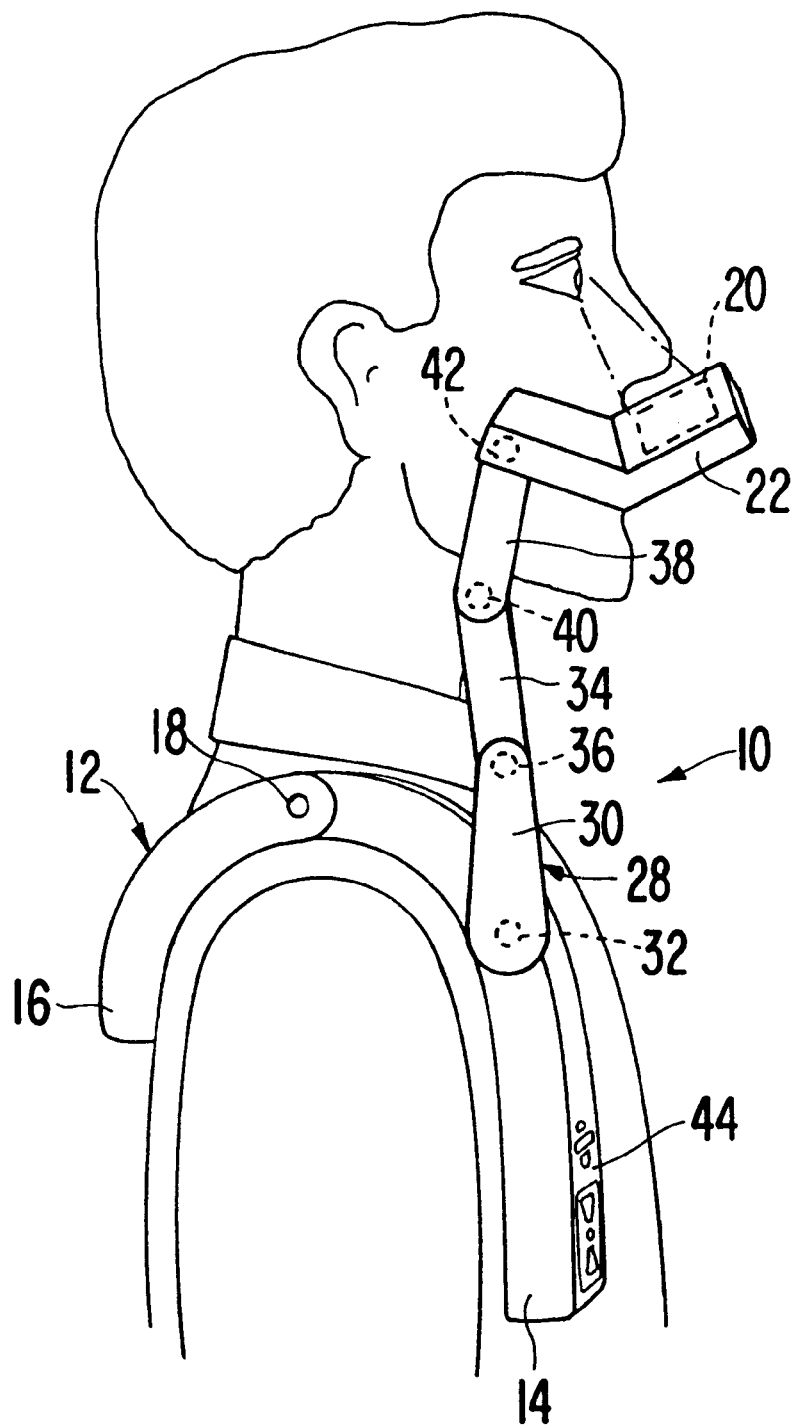
FIG. 2 is a side view of the upper body mounted display system of FIG. 1.

As can be seen from FIGS. 1 and 2, the trunk-mounted display system according to the present invention, which is designated generally by the reference numeral 10, includes a support 12 for supporting the system on the trunk of the user, preferably on the user's shoulder. The support articulates about a pivot connector 18, and includes a front member 14 and a rear member 16, each of which is curved to conform to the shoulder of a user. The front member 14 is connected to the rear member 16 by the pivot connector 18. A torsion spring 19 biases the front member 14 and the rear member 16 toward one another to firmly clamp the support 12 onto the shoulder of the user.

The display system 10 further includes a display screen 20 mounted in a display housing 22, with the front of the display screen 20 facing the user. The display screen 20 may be implemented in any suitable technology such as, but not limited to, LED and LCD technologies. In the illustrated embodiment, the display housing 22 is an angled member having a first leg 24 containing the display 20 and a second leg 26 which is connected to the support 12 by a linkage 28. The linkage 28 includes a plurality of links connected to one another by joints so that the links are movable relative to one another. The links include a first link 30 movably connected to the front member 14 of the support portion 12 by a joint 32 adjacent a lower end of the link 30. An upper end of the link 30 is movably connected to a lower end of a link 34 by a movable joint 36. An upper end of the link 34 is movably connected to a lower end of a link 38 by a movable joint 40. An upper end of the link 38 is connected by a movable joint 42 to the leg 26 of the display housing 22. Sufficient friction is provided in each of the joints 32, 36, 40 and 42 to support the weight of all of the members above the joint and prevent movement of the members above the joint relative to members below the joint. It is only by the application of an outside force sufficient to overcome the friction that the link 30 is made to move relative to the support 12, the link 38 is made to move relative to the display housing 22, and the links 30, 34 and 38 are made to move relative to one another. Thus, the user can move the display 20 by hand to his or her personal most convenient and comfortable position, and the display 20 will remain in that position unless the display member 20 or one or more of the links 30, 34 and 38 are moved by the application of a force sufficient to overcome the friction in one or more of the joints 32, 36, 40 and 42. All of the joints can be ball-and-socket joints. As an alternative, some of the joints can be pivot joints and other of the joints can be ball-and-socket joints. Joints of other types may also be included. It will be appreciated that any suitable mechanical link can be used to support the display screen relative to the shoulder support 12 so long as it permits movement of the display relative to the field of view of the user, preferably six degrees of movement with respect to the user's field of view; up-down, right-left, in-out, horizontal axis rotation, vertical axis rotation and z axis rotation. In addition, in the preferred embodiment, the display housing and its mechanical linkage to the support 12 can be folded into the support.

The entire mounting for the trunk-mounted display system according to the present invention can be made of plastic or other suitable material. An electrical connection W between the display 20 and an associated computer C extends from the display member 22 to a computer, which can be mounted on another part of the user's body or can be mounted in a hollow portion 43 of the support 12. The various parts of the display system can be made hollow or made with passages to accommodate the electrical connection W. As can be seen from FIG. 1, the electrical connection passes from each of the display member 22, the links 38, 34 and 30 and the support 12 to the adjacent member at a point next to one of the movable joints 42, 40, 36 and 32. As an alternative, the electrical connection can extend externally from the display 20 to the computer C. Controls 44 for the computer can be located in a forward area on the front member 14 of the support portion 12, in contact with the chest of the user. The controls 44 can include a mouse, a mute control, a loudness control and/or a microphone for voice control of the computer and display. Thus, the controls 44 can comprise a touch responsive or hand responsive user interface to the computer driven, information display system. Many other types of controls are known and can be included among the controls 44.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A hands-free, computer driven, information display system, including an information display surface adapted to be positioned at a distance from the eyes of a user when the user is viewing information on said display surface, comprising in combination:

means for hands-free and head-free support of the information display surface at a distance from a user's eye such that as the user moves his or her head vertically and horizontally the user's field of view moves vertically and horizontally relative to said information display surface between a position where said information display surface is in the position to be viewed by a user at said distance from the eyes of the user and a position where the information display surface is outside the user's field of view;

said means for hands-free and head-free support including a member which engages the trunk of the user and a support arm, which is attached to and extends from said member, and to which support arm said information display surface is attached;

said means for hands-free and head-free support providing at least the following degrees of movement of said display surface relative to said head in a stationary position, namely in and out, up and down, and right and left.

2. The hands-free display system as in claim 1 wherein said trunk-engaging member is an articulated curved member that fits over the shoulder of a user and is resiliently biased to engage a portion of the user's back and chest and said trunk-engaging member includes a hand responsive user interface to said computer driven, information display system.

3. A hands-free display system as in claim 1 wherein said means for hands-free and head-free support of the information display surface provides six degrees of movement of said display surface, namely, along the following axes with respect to the field of view of a user, up, down, right, left, in, out, and rotation about each of these axes.

4. A hands-free display system as in claim 2 wherein said means for hands-free and head-free support of the information display surface provides six degrees of movement of said display surface, namely, along the following axes with respect to the field of view of a user, up, down, right, left, in, out, and rotation about each of these axes.

\* \* \* \* \*